(12) United States Patent
Spanias et al.

(10) Patent No.: US 11,481,881 B2
(45) Date of Patent: Oct. 25, 2022

(54) ADAPTIVE VIDEO SUBSAMPLING FOR ENERGY EFFICIENT OBJECT DETECTION

(71) Applicants: Andreas Spanias, Tempe, AZ (US); Pavan Turaga, Tempe, AZ (US); Sameeksha Katoch, Tempe, AZ (US); Suren Jayasuriya, Tempe, AZ (US); Divya Mohan, Belmont, CA (US)

(72) Inventors: Andreas Spanias, Tempe, AZ (US); Pavan Turaga, Tempe, AZ (US); Sameeksha Katoch, Tempe, AZ (US); Suren Jayasuriya, Tempe, AZ (US); Divya Mohan, Belmont, CA (US)

(73) Assignee: Arizona Board of Regents on Behalf of Arizona State University, Tempe, AZ (US)

(*) Notice: Subject to any disclaimer, the term of this patent is extended or adjusted under 35 U.S.C. 154(b) by 312 days.

(21) Appl. No.: 16/901,961

(22) Filed: Jun. 15, 2020

(65) Prior Publication Data
US 2021/0012472 A1 Jan. 14, 2021

Related U.S. Application Data

(60) Provisional application No. 62/872,902, filed on Jul. 11, 2019.

(51) Int. Cl.
*G06T 5/40* (2006.01)
*G06T 5/50* (2006.01)
*G06T 7/00* (2017.01)

(52) U.S. Cl.
CPC .............. *G06T 5/40* (2013.01); *G06T 5/50* (2013.01); *G06T 7/0002* (2013.01); *G06T 2207/10016* (2013.01); *G06T 2207/20224* (2013.01)

(58) Field of Classification Search
CPC ........... G06T 5/40; G06T 5/50; G06T 7/0002; G06T 2207/10016; G06T 2207/20224
USPC .......................................................... 382/100
See application file for complete search history.

(56) References Cited

U.S. PATENT DOCUMENTS

2009/0028432 A1* 1/2009 Rossato ................. G06T 7/194
382/173

FOREIGN PATENT DOCUMENTS

AU 2014250724 A1 * 5/2016

OTHER PUBLICATIONS

Alexe et al., "Measuring the objectness of image windows," IEEE Trans. on Pattern Analysis and Machine Intelligence, vol. 34, No. 11, pp. 2189-2202,2012.
Alexe, et al., "What is an object?" CVPR, 2010 IEEE Conference on. IEEE, 2010, pp. 73-80.
Baraniuk, et al., "Compressive video sensing: algorithms, architectures, and applications," IEEE Signal Processing Magazine, vol. 34, No. 1, pp. 52-66, 2017.
Belfor, et al., "Spatially adaptive subsampling of image sequences," IEEE Transactions on Image Processing, vol. 3, No. 5, pp. 492-500,1994.

(Continued)

*Primary Examiner* — Ayodeji O Ayotunde
(74) *Attorney, Agent, or Firm* — Polsinelli PC (57) ABSTRACT

Various embodiments of systems and methods for adaptive video subsampling for energy-efficient object detection are disclosed herein.

19 Claims, 9 Drawing Sheets
(3 of 9 Drawing Sheet(s) Filed in Color)

(56) References Cited

OTHER PUBLICATIONS

Braun, et al., "Direct tracking from compressive imagers: A proof of concept," in 2014 IEEE International Conference on Acoustics, Speech and Signal Processing (ICASSP). IEEE, 2014, pp. 8139-8142.

Buckler, et al., "Reconfiguring the imaging pipeline for computer vision," 2017 IEEE International Conference on Computer Vision (ICCV). IEEE, 2017, pp. 975-984.

Candes, et al., "Robust uncertainty principles: Exact signal reconstruction from highly incomplete frequency information," IEEE Transactions on Information Theory, vol. 52, No. 2, pp. 489-509, 2006.

Deng, et al., "Imagenet: A large-scale hierarchical image database," in Computer Vision and Pattern Recognition, 2009. CVPR 2009. IEEE Conference on. IEEE, 2009, pp. 248-255.

Dong, et al., "Adaptive downsampling for high-definition video coding," IEEE Transactions on Circuits and Systems for Video Technology, vol. 24, No. 3, pp. 480-488, 2014.

Duarte, et al., "Single-pixel imaging via compressive sampling," IEEE Signal Processing Magazine, vol. 25, No. 2, pp. 83-91, 2008.

Guo, et al., "Efficient image sensor subsampling for dnn-based image classification," Proceedings of the International Symposium on Low Power Electronics and Design. ACM, 2018, p. 40.

Kulkarni, et al., "Reconstruction-free action inference from compressive imagers," IEEE Transactions on Pattern Analysis and Machine Intelligence, vol. 38, No. 4, pp. 772-784, 2016.

LiKamWa, et al., "Energy characterization and optimization of image sensing toward continuous mobile vision," Proceeding of the 11th Annual International Conference on Mobile Systems, Applications, and Services. ACM, 2013, pp. 69-82.

LiKamWa, et al., "Draining our glass: An energy and heat characterization of google glass," Proceedings of 5th Asia-Pacific Workshop on Systems. ACM, 2014, p. 10.

Lin, et al., "Adaptive downsampling to improve image compression at low bit rates," IEEE Transactions on Image Processing, vol. 15, No. 9, pp. 2513-2521, 2006.

Lucas, et al., "An iterative image registration technique with an application to stereo vision," 1981.

Otsu, "A threshold selection method from gray-level histograms," IEEE Transactions on Systems, Man, and Cybernetics, vol. 9, No. 1, pp. 62-66, 1979.

Razavian, et al., "CNN features off-the-shelf: an astounding baseline for recognition," in Proceedings of the IEEE Conference on Computer Vision and Pattern Recognition Workshops, 2014, pp. 806-813.

Yang, et al., "A faster pytorch implementation of faster r-cnn," https://github.com/jwyang/faster-rcnn.pytorch, 2017.

* cited by examiner

Reference frame

FIG. 5A

Objectness map

FIG. 5B

Group of pixels

Binary mask

ADAPTIVE VIDEO SUBSAMPLING FOR ENERGY EFFICIENT OBJECT DETECTION

CROSS REFERENCE TO RELATED APPLICATIONS

This is a non-provisional application that claims benefit to U.S. provisional application Ser. No. 62/872,902 filed on Jul. 11, 2019, which is herein incorporated by reference in its entirety.

GOVERNMENT SUPPORT

The invention was made with government support under grant 1659871 awarded by the National Science Foundation. The Government has certain rights in the invention.

FIELD

The present disclosure generally relates to image processing, and in particular, to adaptive video subsampling for energy-efficient object detection in image processing.

BACKGROUND

A critical performance requirement for embedded computer vision is energy efficiency in order to preserve battery life for mobile and autonomous platforms. In particular, the image sensor and readout can take up a significant amount of energy in a computer vision pipeline, particularly if the sensor is capturing and processing video data in real-time. Some subsampling methods can save energy, however, this comes at the cost of potential loss of visual detail for objects that may be necessary for end-task performance. This will certainly be the case if the subsampling approach is agnostic to semantic information in the frames. Thus, there is an opportunity to design smart sampling approaches, which can determine the sampling pattern based on scene content, to save energy while preserving computer vision task performance It is with these observations in mind, among others, that various aspects of the present disclosure were conceived and developed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Corresponding reference characters indicate corresponding elements among the view of the drawings. The headings used in the figures do not limit the scope of the claims.

DETAILED DESCRIPTION

Object detection for videos is a critical application with implications for self-driving cars, surveillance, and autonomous robotics. To enable energy-efficient video object detection, an adaptive system to subsample video frames that uses a metric for objectness and intensity-based segmentation, referred to as the "system" or the "adaptive subsampling system" is disclosed herein. Referring to the drawings, embodiments of the adaptive subsampling method are illustrated and generally indicated as 100 in FIGS. 2-7 and embodiments of an associated system for implementation of the adaptive subsampling method are illustrated and generally indicated as 200 in FIGS. 1 and 8.

Figure 1:
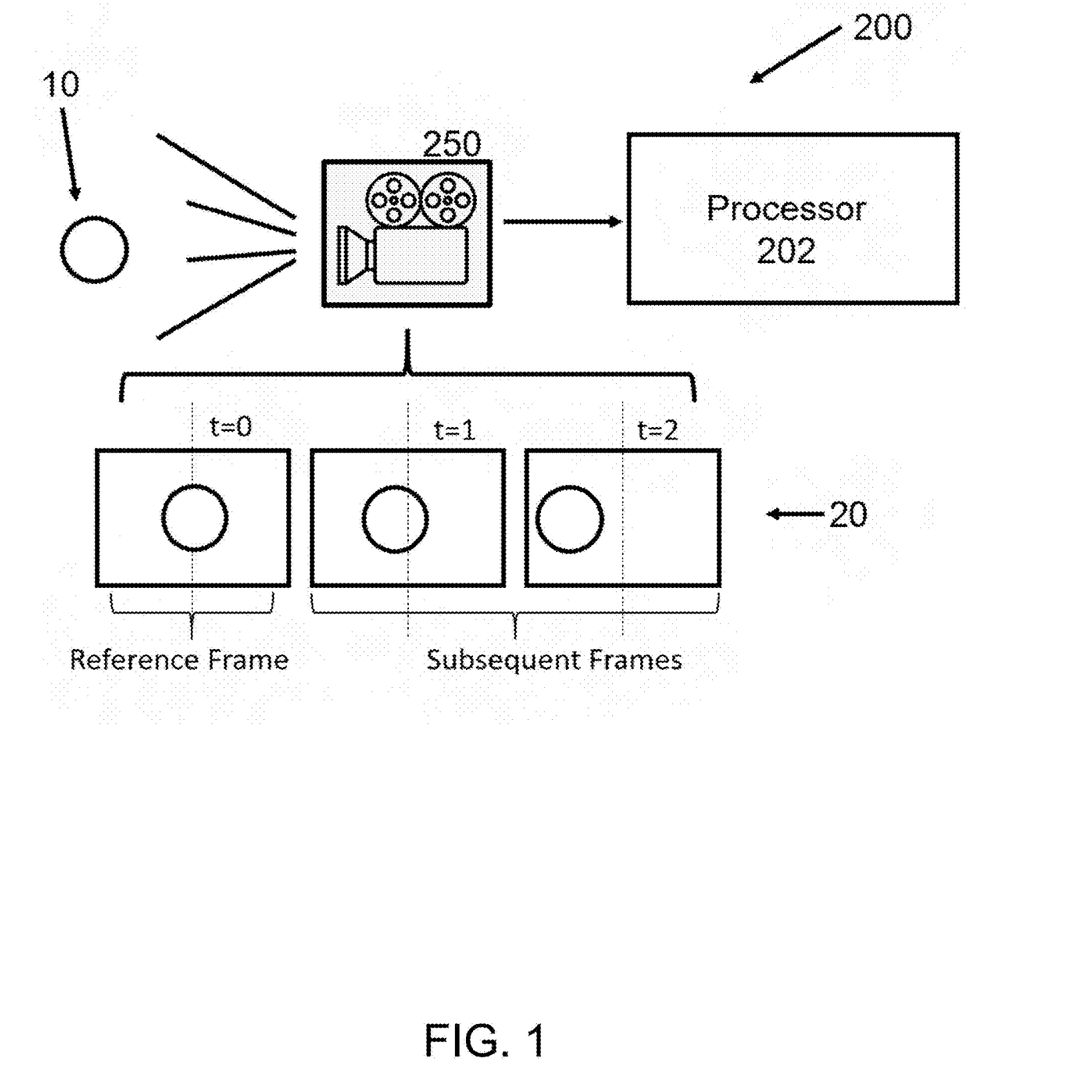
FIG. 1 is a diagram showing a video camera capturing a video of an object for execution of the adaptive video subsampling method embodied in the present system.

Referring to FIG. 1, a system 200 is illustrated showing a video camera 250 pointing at an object 10. The video camera 250 is in direct communication with a processor 202 of the system 200 and produces a plurality of video frames 20, including a reference frame and a plurality of subsequent frames. The processor 202 runs the method 100 for facilitating subsampling based on the reference frame, a process which will be described in greater detail below.

It is required that the method 100 operates at run-time—determining the future subsampling patterns based only on prior frames (i.e. a causal system)—such that it can perform on incoming video frames 20. The method 100 is conceptually simple, as it was desired to reduce the amount of overhead computation needed to allow for adaptive sampling. In addition, minimal degradation in object detection performance is observed while saving energy. The method 100 is shown in a flowchart in FIG. 2.

The method 100 is configured to function on embedded platforms that have limited resources, including platforms without a GPU, and thus no way to re-train the object detection neural network to adapt to the subsampling pattern. The advantage of the disclosed method is that it is immediately deployable to existing systems such as unmanned aerial vehicles and robotic platforms, thereby requiring no training or GPUs on-board.

Objectness as semantic information: The first key issue considered is a manner of extracting semantic information from previous frame(s). While there are several techniques that could be used as generic visual features including convolutional neural network features, an objectness determination method is utilized which trains a measure for objectness for a given image. This makes the present method 100 highly tuned for object detection, and does not require an additional neural network to be stored on the embedded device to extract visual features. This objectness determination method quantifies how likely it is for an image window to cover an object of any class, doing so by considering four image cues: multi-scale saliency, color contrast, edge density and straddleness. Combining different image windows, the objectness determination method produces an objectness map, which illustrates how the objectness map still can identify primary objects even when operating on different types of subsampled imagery, as shown in FIGS. 7A-7F. These objectness maps are used to determine spatial subsampling in the video.

Figure 2:
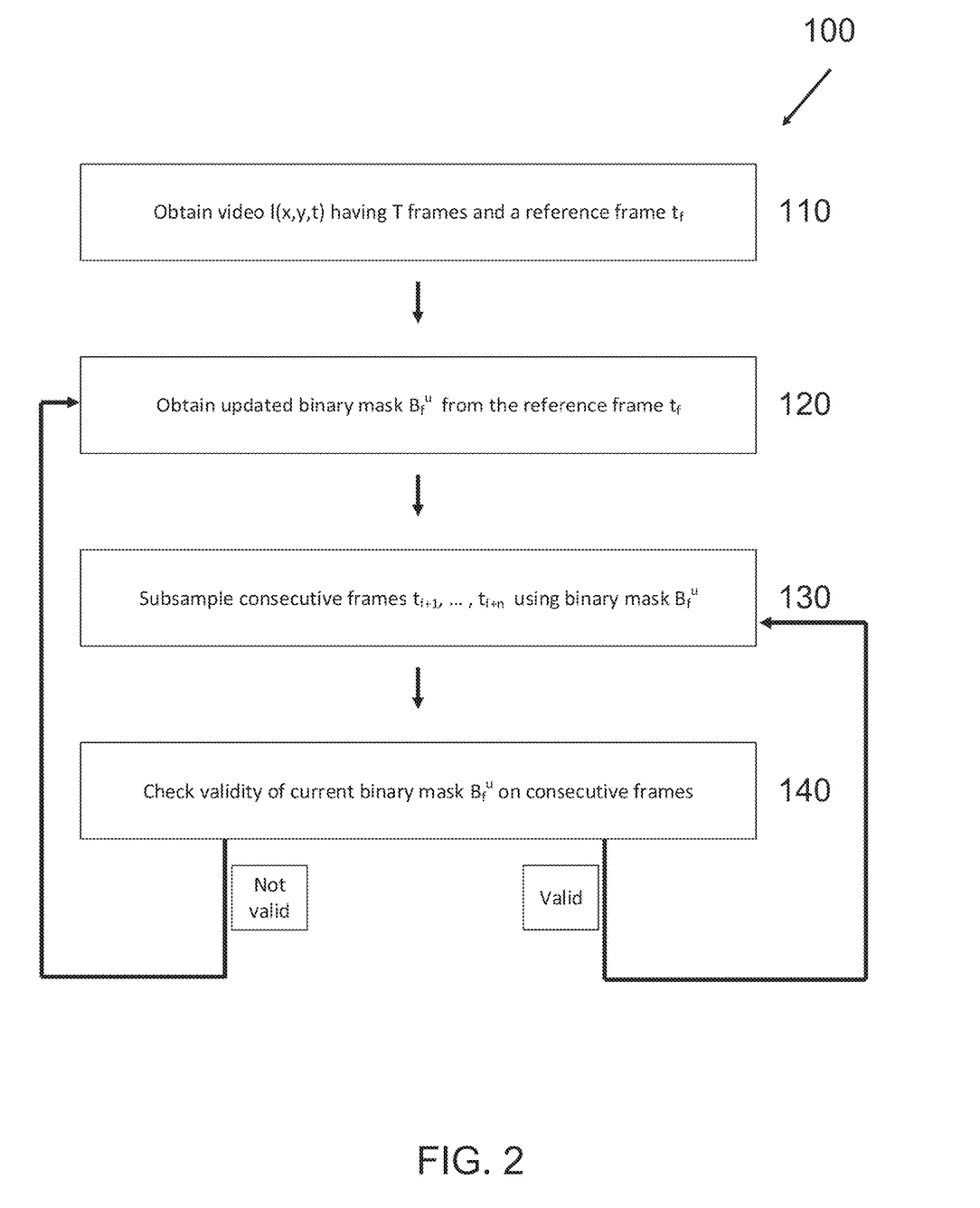
FIG. 2 is a flowchart demonstrating the adaptive video subsampling method embodied in the present system.
Figure 5A:
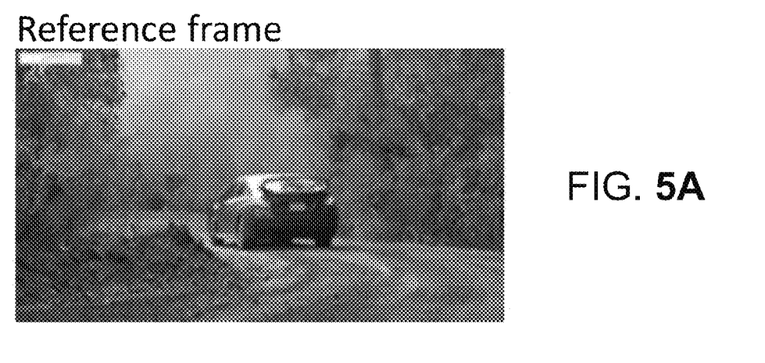
FIGS. 5A, 5B and 5C show respective images of a reference frame, a corresponding objectness map, and a corresponding subsampled frame as obtained using the method of FIG. 2.
Figure 5B:
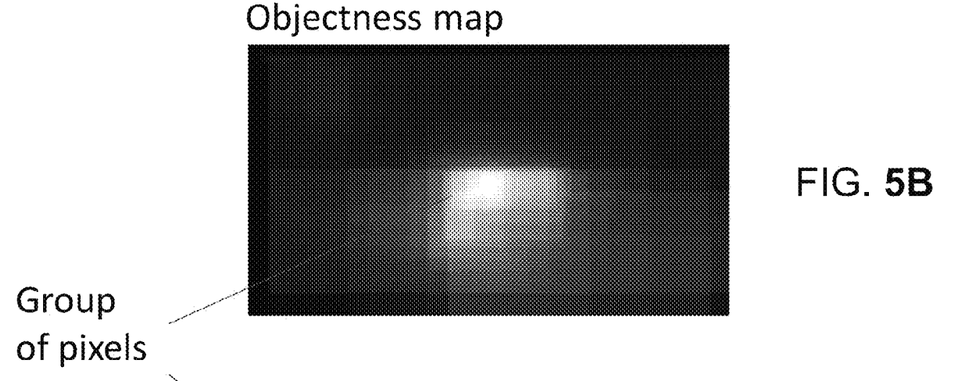
Figure 5C:
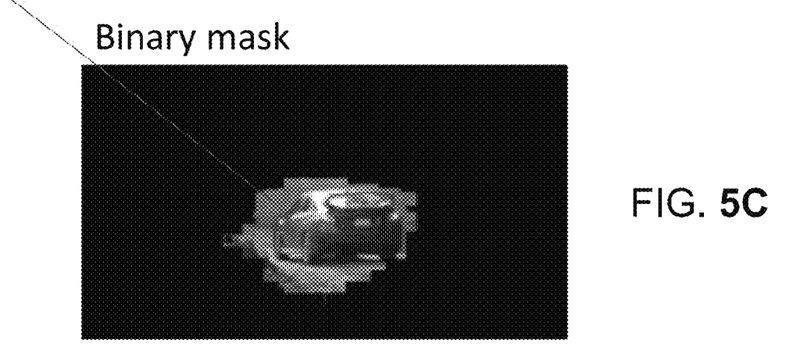

Adaptive Subsampling Algorithm:

Referring to FIGS. 2 and 5, the adaptive method 100, which couples an objectness map with intensity changes in the video 20 to determine a spatial sampling pattern, is disclosed herein. Referring to block 110 of FIG. 2, let I(x, y, t) represent a video where (x, y) is representative of the locations of the pixels and t is representative of the frame index in time. Let $N_1$ and $N_2$ represent number of rows and columns in a given frame, respectively. Consequently, the number of pixels in a given frame is given by $P=N_1/N_2$ for a gray-scale image. $M_i$ for $1<i<T$ is representative of the objectness maps as described above, and T is representative of the total number of frames in the video. Referring to block 110, a reference frame $t_f$ is selected from the video. An example frame is shown in FIG. 5A. As shown in block 120, a binary mask $B_f^u$ is created which is used to then subsample subsequent frames $t_{f+1}, \ldots, t_{f+n}$ in block 130. FIG. 5C shows an example binary mask created for the reference frame of FIG. 5A. Validity of the binary mask $B_f^u$ is continually evaluated, as shown in block 140. If the binary mask $B_f^u$ no longer captures the object 10 in subsequent frames, then step 120 is repeated to obtain a new binary mask $B_g^u$ for a new reference frame $t_g$. If the binary mask $B_f^u$ is still valid and captures the object 10 in subsequent frames, then step 130 is repeated for subsequent frames until it is no longer valid (i.e. the object moves out of frame).

Figure 3:
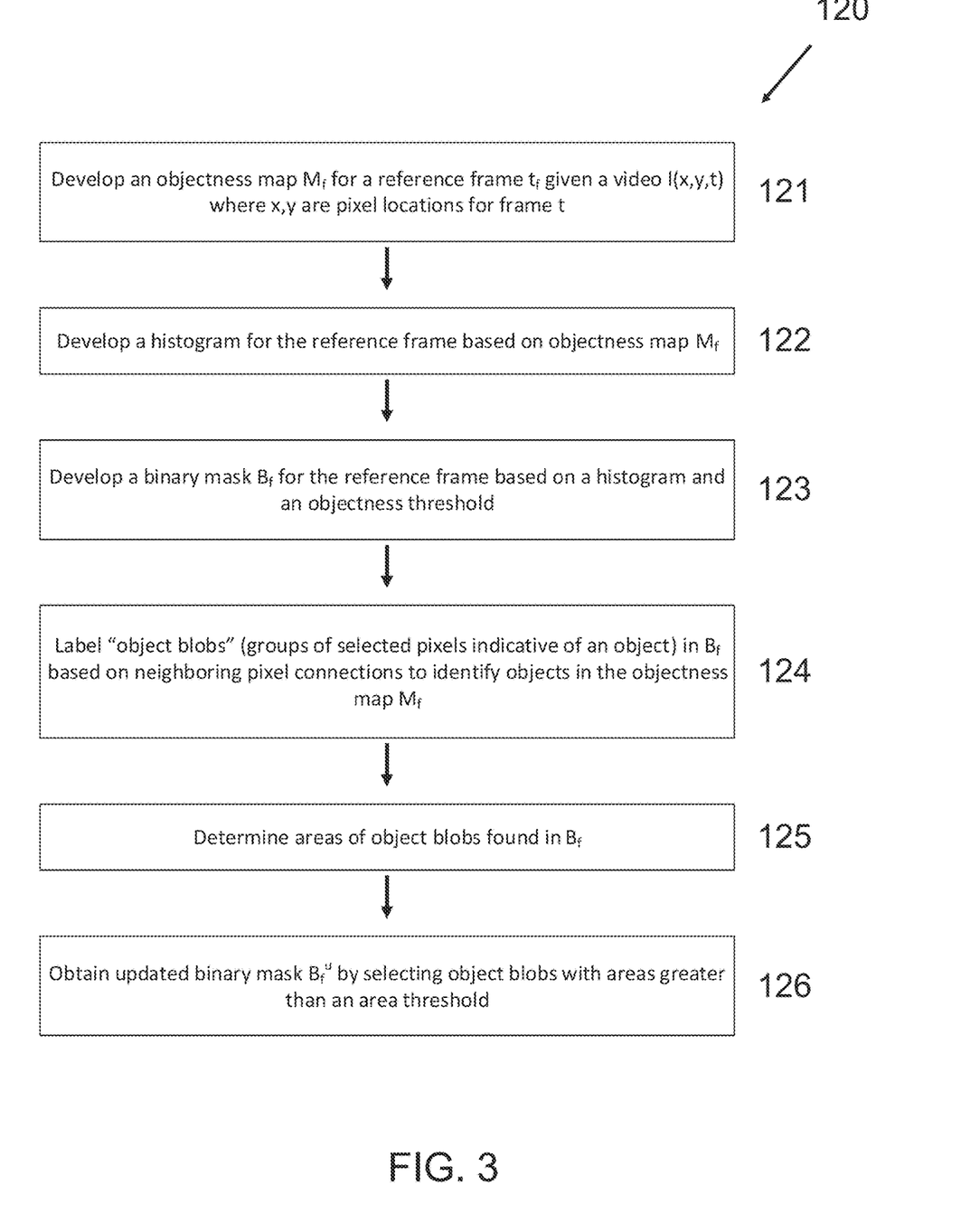
FIG. 3 is a flowchart illustrating a step of obtaining a binary mask of the method of FIG. 2.

Referring to block 121 of FIG. 3, the step 120 of creating a binary mask $B_f^u$ includes developing a gray-scale objectness map $M_f$ for the reference frame $t_f$. FIG. 5B shows an example objectness map for the frame of FIG. 5A. Referring to block 122, a histogram of the objectness map $M_f$ is then developed. Based on the histogram and an empirically-chosen objectness threshold, the objectness map $M_f$ is converted to an initial binary mask $B_f$ (block 123). The objectness threshold is determined either by empirically-chosen values or by Otsu's method.

In reference to block 124, groups of selected pixels indicative of an object 10, referred to herein as "object blobs", in the initial binary mask $B_f$ are labeled based on their neighboring pixel connections. Once these object blobs in the initial binary mask $B_f$ are identified, an area of these object blobs is computed (block 125) and only objects with an area greater than a threshold of 2,000 pixels are selected to obtain a binary mask $B_f^u$ (block 126). This binary mask $B_f^u$ is then used for subsampling for the next consecutive frame, as shown in block 130 of FIGS. 2 and 4.

Figure 4:
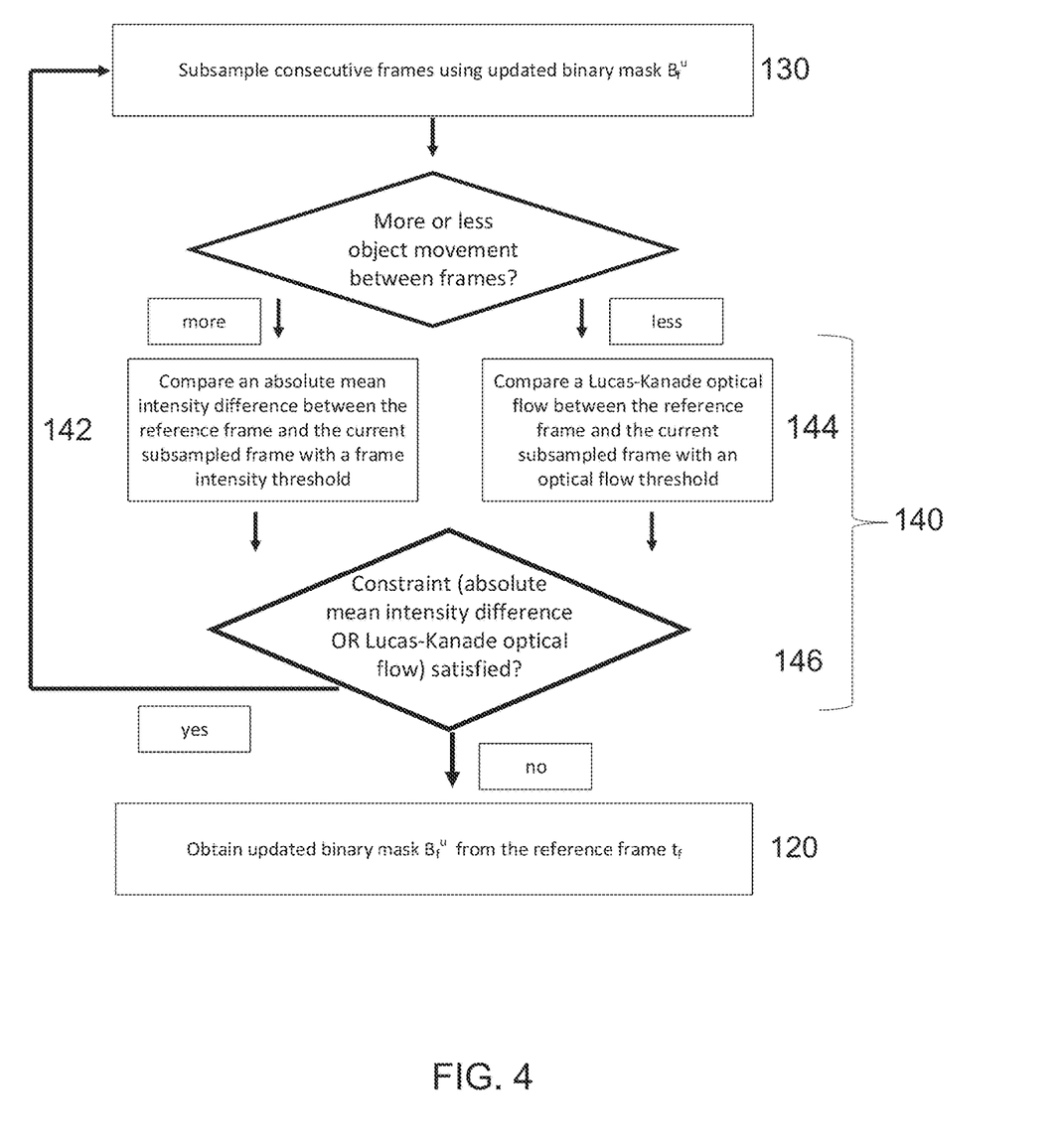
FIG. 4 is a flowchart illustrating a step of checking binary mask validity of the method of FIG. 2.
Figure 6:
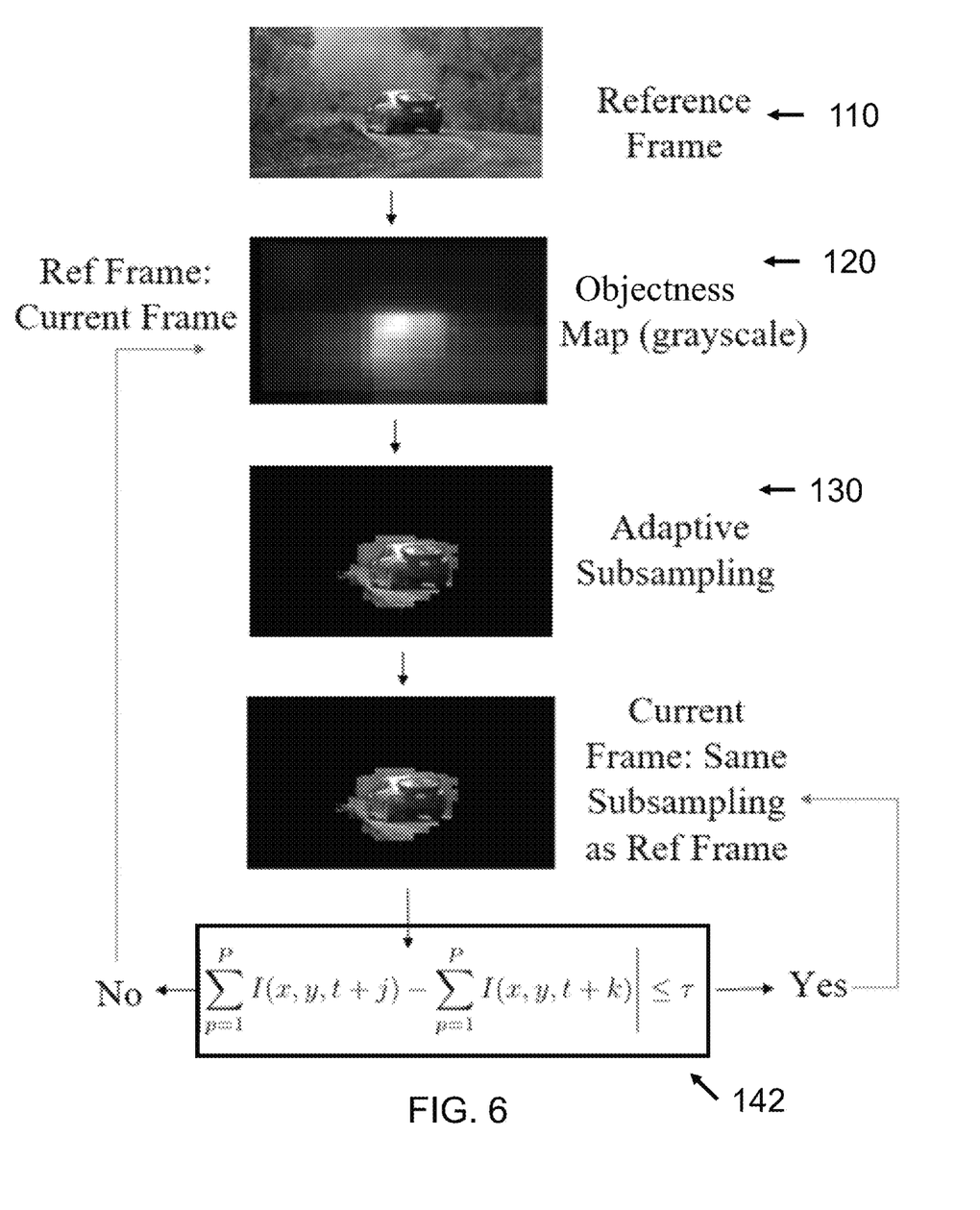
FIG. 6 is a flowchart including graphical representations showing the original image and its resulting objectness map, the image having undergone random pixelation and its resulting objectness map, the image having undergone checkerboard mask and its resulting objectness map, and the image having undergone adaptive video sampling and its resulting objectness map in terms of the method of FIG. 2.
Figure 7A:
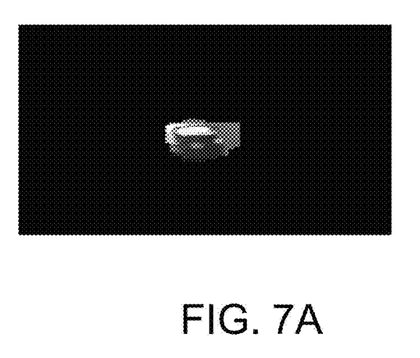
FIG. 7A-7F are graphical representations showing various binary masks for consecutive frames, with FIG. 7F showing an outdated and invalid binary mask as executed by the method of FIG. 2.
Figure 7B:
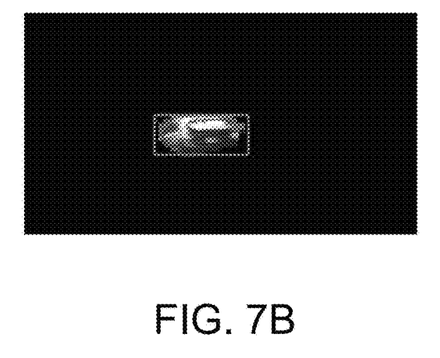
Figure 7C:
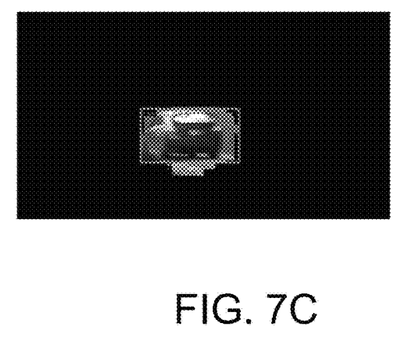
Figure 7D:
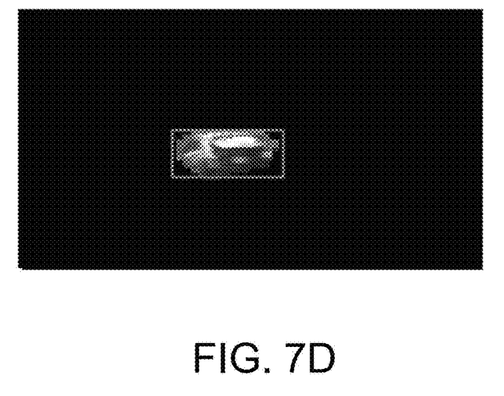
Figure 7E:
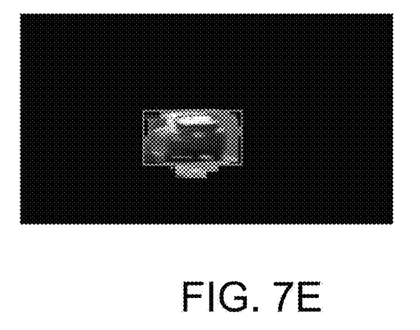
Figure 7F:
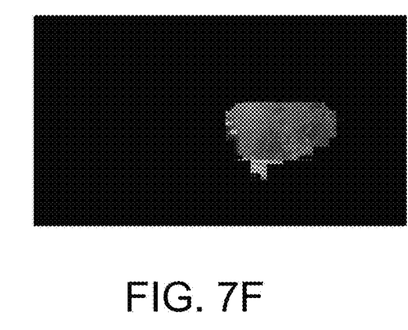

Referring to FIGS. 2 and 4, the updated binary image is the final binary mask $B_f^u$ which is used to turn off pixels in the reference frame. The binary mask $B_f^u$ is used to subsample the consecutive frames in the video, as shown in block 130. However, the underlying assumption is that the objects 10 in the scene do not move significantly such that the updated binary mask is still relevant in the subsampling. Referring to FIG. 4, the assumption is continually validated for subsequent frames, as shown in block 140. To check the continued validity of the assumption, one of two constraints are applied. If the object 10 in the video tends to move around between frames more, then an absolute mean intensity difference is calculated between the reference frame and the current sub-sampled frame, as shown below and in block 142:

$$\left| \sum_{(x,y)} I(x, y, t+j) - \sum_{(x,y)} I(x, y, t+k) \right| \leq \tau$$

wherein I(x, y, t+j) represents the reference frame and I(x, y, t+k) represents the current frame. Absolute mean intensity difference is chosen based on its dependency on intensity of each frame, rather than on motion of the object 10. Note that the choice of the Frame Intensity threshold $\tau$ is critical for determining whether to update the reference frame and whether the binary mask may overlap only partially with objects 10 in the reference image. A smaller threshold means the system 100 will be less energy-efficient as more reference frames need to be fully sampled, but the resulting subsampling will more accurately track motion. This process is visually illustrated in FIG. 6.

If the object 10 moves less between frames, then an optical flow between two frames is also considered, as shown in block 144. The Lucas-Kanade optical flow is evaluated, and if the mean magnitude of the optical flow is less than a fixed threshold $\varphi$, the same subsampling binary mask as the previous frame is used. This validation method is chosen based on its ability to pick up on minute motion changes.

Referring to block 146 of FIG. 4, if the chosen constraint as evaluated in block 142 or 144 is not satisfied, a new reference frame $t_g$ is captured, and a new binary mask $B_g^u$ is generated according to block 120. If the chosen constraint as evaluated in block 142 or 144 is satisfied, consecutive frames are subsampled using the current binary mask $B_f^u$ according to block 130.

Results

Dataset: For the video subsampling algorithm, the ILSVRC2015 Image Vid Dataset which has 555 video snippets with 30 classes was used. For the experiments, videos with 6 classes namely, Bird, Watercraft, Car, Dog, Horse and Train were considered. Object detection was performed using an implementation of Faster RCNN, an object classification algorithm. The accepted metric of object detection, mean Average Precision (mAP), per classification is obtained based on the bounding boxes from the video frames.

Four types of subsampling are compared: (1) random sub-sampling where each pixel has a probability a of being turned off, (2) the disclosed adaptive sampling algorithm using Otsu's method for objectness threshold and values of 0.1, 0.3, 0.5 for the frame intensity threshold, (3) adaptive subsampling algorithm with Otsu's method for objectness threshold and an optical flow magnitude threshold with values 0.0015, 0.005, 0.015, and (4) adaptive subsampling with the tuned parameters of 0.15 for the objectness threshold and 0.1 for the frame intensity threshold. These parameters were initially tuned on a separate video from the dataset which was not considered during the test.

Energy modeling: For energy modeling, it was assumed that the proportion of pixels that are turned off are proportional to the savings in readout energy. As described above, $\tau$ (i.e. the frame intensity threshold) is one of the most important parameters to control the energy savings while keeping the accuracy of object detection at almost the same level. If the optimization constraint is too strong (i.e. $\tau$ is really low), it will lead to subsampling calculation of every consecutive frame which will result in high computation time. It will make the algorithm inefficient for use in camera sensors. However, if this threshold τ is large, it can lead to conditions where the subsampling strategy neglects the changes due to object motion. The choice of φ (i.e. Flow Magnitude threshold) can be justified similarly.

Figure 8:
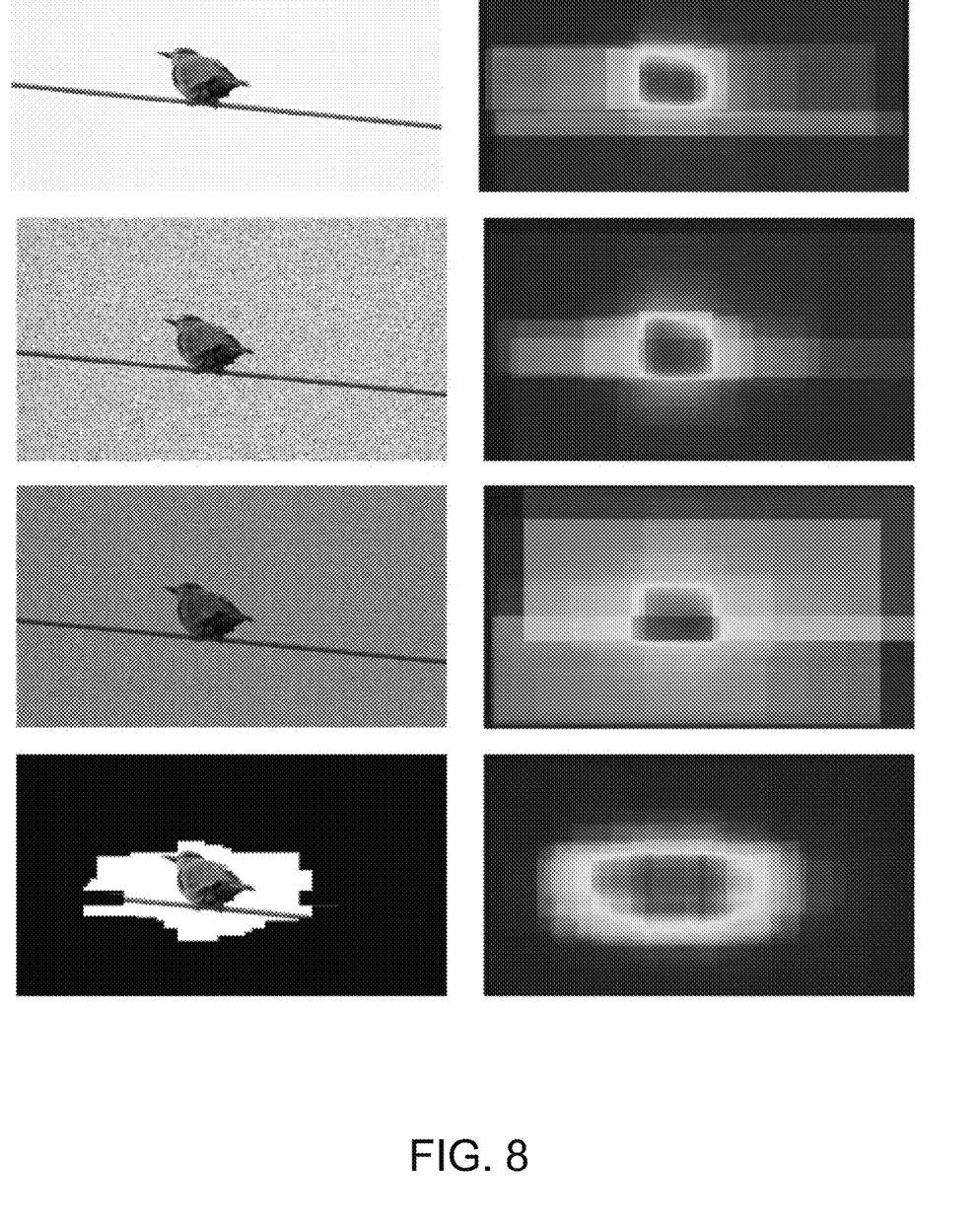
FIG. 8 is a series of graphical representations showing object detection for three different frame intensity thresholds, and showing object detection for three different Optical Flow Magnitude Thresholds.

Qualitative Results: In FIG. 8, some visuals of detected objects from adaptive subsampling strategy are shown. For the shown result, a frame is chosen from the "Car" video and a bounding box generated on each subsampled frame is shown. It is evident that even after turning off a large number of pixels, Faster RCNN is able to detect the object in most cases.

Example embodiments described herein may be implemented at least in part in electronic circuitry; in computer hardware executing firmware and/or software instructions; and/or in combinations thereof. Example embodiments also may be implemented using a computer program product (e.g., a computer program tangibly or non-transitorily embodied in a machine-readable medium and including instructions for execution by, or to control the operation of, a data processing apparatus, such as, for example, one or more programmable processors or computers). A computer program may be written in any form of programming language, including compiled or interpreted languages, and may be deployed in any form, including as a stand-alone program or as a subroutine or other unit suitable for use in

TABLE 1

| Subsampling Strategies | Fully Sampled | Random Subsampling (α) | | | Adaptive Subsampling (Otsu's Objectness Threshold + Frame Intensity Threshold) | | | Adaptive Subsampling (Flow Magnitude Threshold ($10^{-3}$)) | | | Adaptive Subsampling (Objectness Threshold + Frame Intensity Threshold) |
|---|---|---|---|---|---|---|---|---|---|---|---|
| | | 0.15 | 0.25 | 0.35 | 0.1 | 0.3 | 0.5 | 1.5 | 5.0 | 15.0 | 0.15 + 0.1 |
| mAP | 55.5 | 15.4 | 5.9 | 0.9 | 40.1 | 37 | 38 | 41.8 | 41.7 | 28.6 | 50.1 |

TABLE 2

| Subsampling Strategies | Random Subsampling (α) | | | Adaptive Subsampling (Otsu's Objectness Threshold + Frame Intensity threshold) | | | Adaptive Subsampling (Flow Magnitude Threshold ($10^{-3}$)) | | | Adaptive Subsampling (Objectness Threshold + Frame Intensity threshold) |
|---|---|---|---|---|---|---|---|---|---|---|
| | 0.15 | 0.25 | 0.35 | 0.1 | 0.3 | 0.5 | 1.5 | 5.0 | 15.0 | 0.15 + 0.1 |
| Bird | 14.16 | 22.75 | 30.80 | 87.43 | 86.64 | 86.43 | 92.23 | 92.24 | 92.22 | 54.04 |
| Watercraft | 13.26 | 22.32 | 31.62 | 79.80 | 79.91 | 80.09 | 83.15 | 83.01 | 88.30 | 50.04 |
| Dog | 17.71 | 29.39 | 40.59 | 11.83 | 11.87 | 11.86 | 68.76 | 68.76 | 68.76 | 18.44 |
| Cat | 18.13 | 30.66 | 42.86 | 30.42 | 30.10 | 30.18 | 90.44 | 90.72 | 88.94 | 67.87 |
| Horse | 21.21 | 34.96 | 48.01 | 25.82 | 26.26 | 26.46 | 75.65 | 75.65 | 75.90 | 38.85 |
| Train | 22.24 | 29.60 | 37.41 | 21.05 | 21.02 | 21.07 | 71.19 | 71.19 | 71.19 | 55.97 |

Quantitative Results: To test whether the disclosed subsampling strategy achieves the desired energy savings along with the computer vision task accuracy, the results of mean Average Precision (mAP) scores of fully sampled, randomly subsampled and adaptive subsampled videos are presented in Table 1. It is evident that random subsampling results in the worst mAP scores compared to adaptive sub-sampling strategy. As mentioned above, in adaptive subsampling strategy, a binary mask is used to obtain the sub-sampled frames. This binary mask is developed using the objectness threshold obtained from Otsu's method. As shown in Table 1, the empirical objectness threshold resulted in better mAP score compared to Otsu's objectness threshold. Among the two thresholding methods i.e. optical flow magnitude and frame intensity, the frame intensity threshold performed slightly better with an empirically-chosen objectness threshold, which gives an mAP score of 50.1%. This score is closest to a fully sampled video mAP score of 55.5%

In Table 2, the percentage of pixels turned off for each subsampling strategy is shown. Note that the strategy that received the best mAP score (Adaptive Subsampling with objectness threshold and frame intensity threshold) saves 18-67% of energy.

Computer-Implemented System

Figure 9:
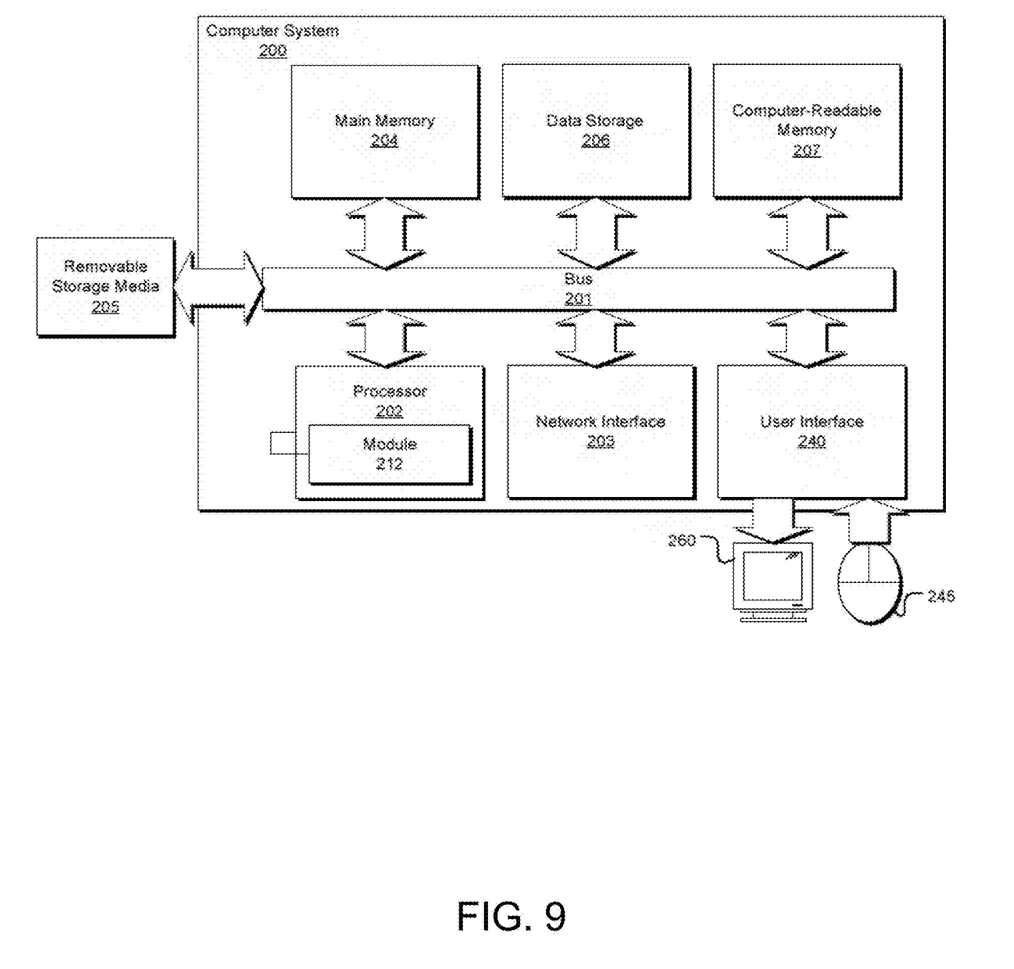
FIG. 9 is a simplified block diagram showing an example of a computing system that may implement various services, systems, and methods discussed herein.

FIG. 9 illustrates an example of a suitable computing and networking environment (computer system 200) which may be used to implement various aspects of the present disclosure, such as the subsampling system application 100.

a computing environment. Also, a computer program can be deployed to be executed on one computer, or to be executed on multiple computers at one site or distributed across multiple sites and interconnected by a communication network.

Certain embodiments are described herein as including one or more modules. Such modules are hardware-implemented, and thus include at least one tangible unit capable of performing certain operations and may be configured or arranged in a certain manner. For example, a hardware-implemented module may comprise dedicated circuitry that is permanently configured (e.g., as a special-purpose processor, such as a field-programmable gate array (FPGA) or an application-specific integrated circuit (ASIC)) to perform certain operations. A hardware-implemented module may also comprise programmable circuitry (e.g., as encompassed within a general-purpose processor or other programmable processor) that is temporarily configured by software or firmware to perform certain operations. In some example embodiments, one or more computer systems (e.g., a stand-alone system, a client and/or server computer system, or a peer-to-peer computer system) or one or more processors may be configured by software (e.g., an application or application portion) as a hardware-implemented module that operates to perform certain operations as described herein.

Accordingly, the term "hardware-implemented module" encompasses a tangible entity, be that an entity that is physically constructed, permanently configured (e.g., hard-wired), or temporarily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software, in the form of the system application 100 or otherwise, may include a hardware-implemented module and may accordingly configure a processor 202, for example, to constitute a particular hardware-implemented module at one instance of time and to constitute a different hardware-implemented module at a different instance of time.

Hardware-implemented modules may provide information to, and/or receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in a memory structures to which the multiple hardware-implemented modules have access. For example, one hardware-implemented module may perform an operation, and may store the output of that operation in a memory device to which it is communicatively coupled. A further hardware-implemented module may then, at a later time, access the memory device to retrieve and process the stored output. Hardware-implemented modules may also initiate communications with input or output devices.

As illustrated, the computing and networking environment 200 may be a general purpose computing device 200, although it is contemplated that the networking environment 200 may include other computing systems, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the general purpose computing device 200 may include various hardware components, such as a processing unit 202, a main memory 204 (e.g., a system memory), and a system bus 201 that couples various system components of the general purpose computing device 200 to the processing unit 202. The system bus 201 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The general purpose computing device 200 may further include a variety of computer-readable media 207 that includes removable/non-removable media and volatile/non-volatile media, but excludes transitory propagated signals. Computer-readable media 207 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EPSOM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the general purpose computing device 200. Communication media includes computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The main memory 204 includes computer storage media in the form of volatile/nonvolatile memory such as read only memory (ROM) and random access memory (RAM). A basic input/output system (BIOS), containing the basic routines that help to transfer information between elements within the general purpose computing device 200 (e.g., during start-up) is typically stored in ROM. RAM typically contains data and/or program modules that are immediately accessible to and/or presently being operated on by processing unit 202. For example, in one embodiment, data storage 206 holds an operating system, application programs, and other program modules and program data.

Data storage 206 may also include other removable/non-removable, volatile/nonvolatile computer storage media. For example, data storage 206 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media provide storage of computer-readable instructions, data structures, program modules and other data for the general purpose computing device 200.

A user may enter commands and information through a user interface 240 or other input devices 245 such as a tablet, electronic digitizer, a microphone, keyboard, and/or pointing device, commonly referred to as mouse, trackball, or touch pad. Other input devices 245 may include a joystick, game pad, satellite dish, scanner, or the like. Additionally, voice inputs, gesture inputs (e.g., via hands or fingers), or other natural user interfaces may also be used with the appropriate input devices, such as a microphone, camera 250, tablet, touch pad, glove, or other sensor. These and other input devices 245 are often connected to the processing unit 202 through a user interface 240 that is coupled to the system bus 201, but may be connected by other interface and bus structures, such as a parallel port, game port or a universal serial bus (USB). A monitor 260 or other type of display device is also connected to the system bus 201 via user interface 240, such as a video interface. The monitor 260 may also be integrated with a touch-screen panel or the like.

The general purpose computing device 200 may operate in a networked or cloud-computing environment using logical connections of a network Interface 203 to one or more remote devices, such as a remote computer. The remote computer may be a personal computer, a server, a router, a network PC, a peer device or other common network node, and typically includes many or all of the elements described above relative to the general purpose computing device 200. The logical connection may include one or more local area networks (LAN) and one or more wide area networks (WAN), but may also include other networks. Such networking environments are commonplace in offices, enterprise-wide computer networks, intranets and the Internet.

When used in a networked or cloud-computing environment, the general purpose computing device 200 may be connected to a public and/or private network through the network interface 203. In such embodiments, a modem or other means for establishing communications over the network is connected to the system bus 201 via the network interface 203 or other appropriate mechanism. A wireless networking component including an interface and antenna may be coupled through a suitable device such as an access point or peer computer to a network. In a networked environment, program modules depicted relative to the general purpose computing device 200, or portions thereof, may be stored in the remote memory storage device.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A system for adaptive video subsampling, comprising:
a processor configured to perform operations, including:
accessing a reference image from a plurality of image frames, wherein the plurality of image frames are captured by a camera;
developing a binary mask representative of the reference image by identifying one or more pixels of interest and grouping adjacent pixels of interest into pixel groups;
developing an objectness map representative of the reference image;
developing a histogram of the objectness map, wherein the histogram is representative of pixel intensities distributed throughout the first reference image;
updating the binary mask representative of the reference image by selecting pixel groups with an area greater than a pre-determined threshold value;
subsampling subsequent image frames using the updated binary mask;
determining the validity of the reference frame by:
calculating an absolute mean intensity difference between the reference frame and a current subsampled frame; and
comparing the absolute mean intensity difference with a predetermined threshold value.

2. The system of claim 1, wherein pixels of interest are identified from the objectness map by selecting pixels in the histogram within an objectness threshold range.

3. The system of claim 2, wherein the objectness threshold is determined by Otsu's method.

4. The system of claim 2, wherein the objectness threshold is chosen from empirical values.

5. The system of claim 1, wherein the pixels which are not selected in the updated binary mask are operable to be turned off.

6. The system of claim 1, wherein a new reference frame is chosen and a new binary mask is developed if the absolute mean intensity difference falls below the predetermined threshold value.

7. The system of claim 1, wherein the system is a causal system and wherein the system is executed at run-time.

8. A system for adaptive video subsampling, comprising:
a processor configured to perform operations, including:
accessing a reference image from a plurality of image frames, wherein the plurality of image frames are captured by a camera;
developing a binary mask representative of the reference image by identifying one or more pixels of interest and grouping adjacent pixels of interest into pixel groups;
developing an objectness map representative of the reference image;
developing a histogram of the objectness map, wherein the histogram is representative of pixel intensities distributed throughout the first reference image;
updating the binary mask representative of the reference image by selecting pixel groups with an area greater than a pre-determined threshold value;
subsampling subsequent image frames using the updated binary mask; and
determining the validity of the reference frame by:
calculating a mean magnitude of optical flow between the reference frame and a current subsampled frame; and
comparing the mean magnitude of optical flow with a predetermined threshold value.

9. The system of claim 8, wherein a new reference frame is chosen and a new binary mask is developed if a value of mean magnitude of optical flow is above the predetermined threshold value.

10. The system of claim 8, wherein pixels of interest are identified from the objectness map by selecting pixels in the histogram within an objectness threshold range.

11. A method, comprising:
obtaining a video featuring an object, the video having a plurality of frames and defining a reference frame;
developing a binary mask based on the reference frame, wherein the binary mask encapsulates the object in the reference frame and wherein the binary mask is developed by:
developing an objectness map for the reference frame;
developing an objectness histogram for the reference frame based on the objectness map;
developing an initial binary mask for the reference frame based on the objectness map and the objectness histogram;
labeling a plurality of groups of pixels within the initial binary mask which are indicative of an object; and
obtaining the binary mask by selecting one or more groups of pixels with respective areas greater than an area threshold value;

subsampling a plurality of subsequent frames following the reference frame using the binary mask; and checking the validity of the binary mask on one or more of the subsequent frames.

12. The method of claim 11, wherein the groups of pixels are identified based on neighboring pixel connections to identify objects in the objectness map.

13. The method of claim 11, wherein if the binary mask is not valid, then a new reference frame is chosen and a new binary mask is developed for the new reference frame.

14. The method of claim 11, wherein if the binary mask is determined to be valid, then a plurality of subsequent frames are subsampled using the binary mask.

15. The method of claim 11, wherein the objectness map is converted to the initial binary mask based on the objectness histogram and an objectness threshold.

16. The method of claim 15, wherein the objectness threshold is determined using Otsu's method or empirically-chosen values.

17. A method, comprising:
obtaining a video featuring an object, the video having a plurality of frames and defining a reference frame;
developing a binary mask based on the reference frame, wherein the binary mask encapsulates the object in the reference frame ;
subsampling a plurality of subsequent frames following the reference frame using the binary mask; and
checking the validity of the binary mask on one or more of the subsequent frames, wherein the step of checking the validity of the binary mask comprises:
determining satisfaction of a constraint, wherein the constraint is determined using an absolute mean intensity difference with a frame intensity threshold, wherein the absolute mean intensity difference is determined between the reference frame and a selected subsequent frame of the plurality of subsequent frames;
wherein subsequent frames are subsampled using the binary mask if the constraint is satisfied; and
wherein a new reference frame is chosen and a new binary mask is determined if the constraint is not satisfied.

18. The method of claim 17, wherein the binary mask is no longer valid if the object in the video moves out of an area encapsulated by the binary mask.

19. A method, comprising:
obtaining a video featuring an object, the video having a plurality of frames and defining a reference frame;
developing a binary mask based on the reference frame, wherein the binary mask encapsulates the object in the reference frame;
subsampling a plurality of subsequent frames following the reference frame using the binary mask; and
checking the validity of the binary mask on one or more of the subsequent frames, wherein the step of checking the validity of the binary mask comprises:
determining satisfaction of a constraint, wherein the second constraint is determined using a Lucas-Kanade optical flow with an optimal flow threshold, wherein the Lucas-Kanade optical flow is determined between the reference frame and the selected subsequent frame of the plurality of subsequent frames;
wherein subsequent frames are subsampled using the binary mask if the constraint is satisfied; and
wherein a new reference frame is chosen and a new binary mask is determined if the constraint is not satisfied.

* * * * *